United States Patent
Bourcet et al.

[19]

[11] Patent Number: 6,151,578

[45] Date of Patent: Nov. 21, 2000

[54] SYSTEM FOR BROADCAST OF DATA IN AN AUDIO SIGNAL BY SUBSTITUTION OF IMPERCEPTIBLE AUDIO BAND WITH DATA

[75] Inventors: Patrice Bourcet, Mey; Denis Masse, Rosselange; Bruno Jahan, Montigny les Metz, all of France

[73] Assignee: Telediffusion de France, Paris, France

[21] Appl. No.: 08/952,998

[22] PCT Filed: Jun. 3, 1996

[86] PCT No.: PCT/FR96/00833

§ 371 Date: Nov. 21, 1997

§ 102(e) Date: Nov. 21, 1997

[87] PCT Pub. No.: WO96/38927

PCT Pub. Date: Dec. 5, 1996

[30] Foreign Application Priority Data

Jun. 2, 1995 [FR] France .................................. 95 06727

[51] Int. Cl.[7] .................................................. H04H 9/00
[52] U.S. Cl. .......................................... 704/500; 380/253
[58] Field of Search .................................. 704/501, 229, 704/230, 500; 370/214; 380/253; 455/2

[56] References Cited

U.S. PATENT DOCUMENTS 5,319,735  6/1994  Pruss et al. ............................... 704/205
5,450,490  9/1995  Jensen et al. ............................ 380/253
5,574,962  11/1996 Fardeau et al. ............................ 455/2
5,581,800  12/1996 Fardeau et al. ............................ 455/2
5,764,763  6/1998  Jensen et al. ............................ 380/253
5,787,334  7/1998  Fardeau et al. ............................ 455/2
5,945,932  8/1999  Smith et al. .............................. 341/51

FOREIGN PATENT DOCUMENTS 0 245 037  11/1987  European Pat. Off. .
0 372 601  6/1990   European Pat. Off. .
38 06 411  9/1989   Germany .

*Primary Examiner*—David R. Hudspeth
*Assistant Examiner*—Harold Zintel
*Attorney, Agent, or Firm*—Nilles & Nilles SC

[57] ABSTRACT

A system for broadcasting data (D) that can transmit information in the passband of a broadcast audio-frequency signal (S). The system can determine at least one frequency band ($F'_{13}, \ldots, F'_{24}$) and the amplitude ($A'_{13}, \ldots, A'_{24}$) of the audio-frequency signal (S). The system compares this amplitude with an auditory masking level (Nm(13), ..., Nm(24)) associated with this frequency band and eliminates the frequency components of the audio-frequency signal in the frequency band if the amplitude of the signal is lower than the auditory masking level of the band. The system can insert the data in this frequency band at a level lower than or equal to the auditory masking level of the frequency band.

8 Claims, 2 Drawing Sheets

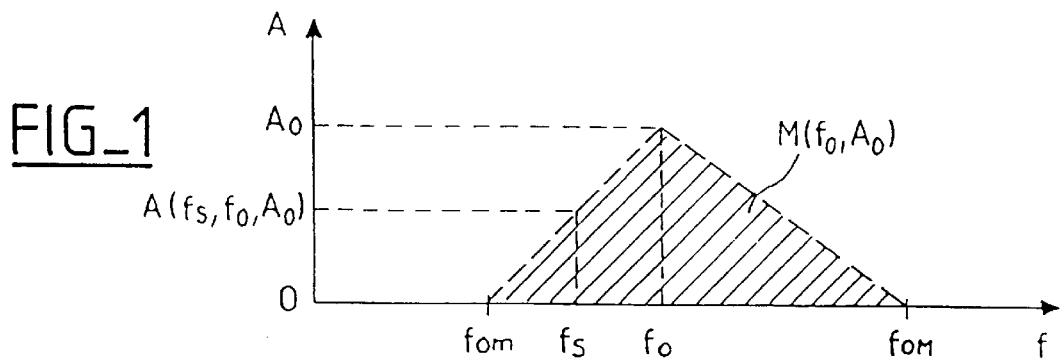
FIG_1
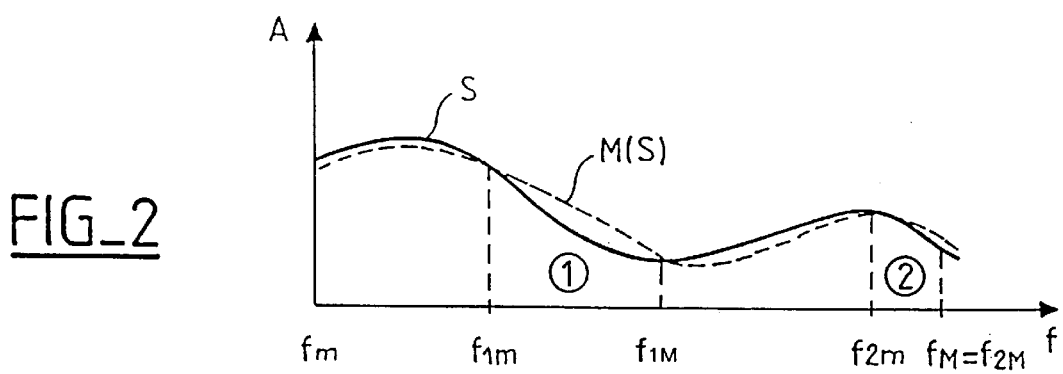
FIG_2
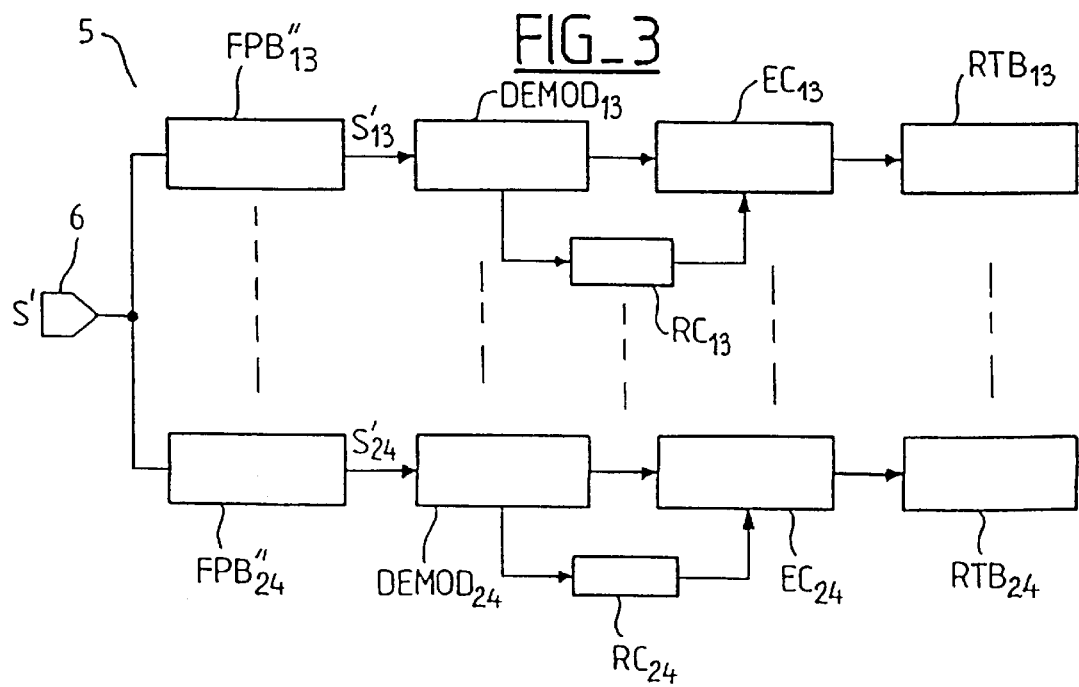
FIG_3

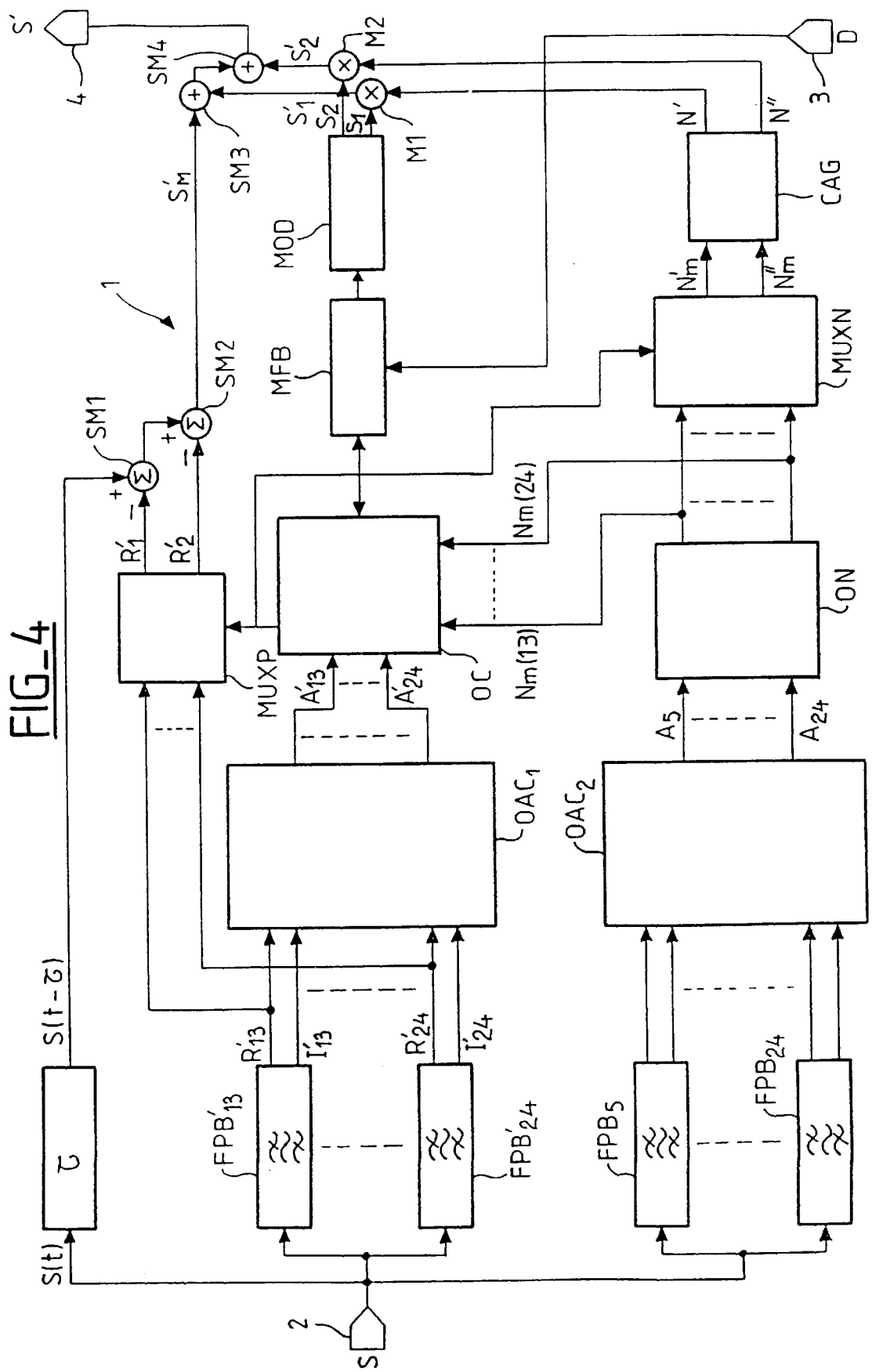
FIG_4

SYSTEM FOR BROADCAST OF DATA IN AN AUDIO SIGNAL BY SUBSTITUTION OF IMPERCEPTIBLE AUDIO BAND WITH DATA

BACKGROUND OF THE INVENTION

1. Field of the Invention

The invention concerns the signal broadcasting field for signals including an audio-frequency component. More especially, it concerns a data broadcasting system.

2. Description of the Related Art

The broadcasting field (broadcasting of TV or radio programmes, radiotelephony, etc.) is well known.

A current tendency is to transmit, in addition to the programmes (or sound in the telephony field), data useful for the broadcasting companies, for control organisations, or for listeners or viewers. This data can concern for example:

- help in selecting a radio or TV programme (example: automatic tuning aids, search for a radio station by name, search by type of programme, search by menu, etc.),
- information on the programme being broadcast or replayed after recording (for example the name of the company which created a programme, the title of a film broadcast by a TV channel, the record reference of a song broadcast by a radio station, etc.),
- service data in the analogue radiotelephone field.

We also remark the development of so-called interactive broadcasting systems which allow the viewers or listeners to dialogue in a more or less efficient manner with the programme source. These means are used either to act on the content of the broadcast programme, or to play, bet or communicate on the subject of this same programme. Thus, a form of interactivity, via small devices simulating pseudodialogue with a programme designed for this purpose, recently appeared. A remote-sized unit gives the illusion of interactivity as it allows, for instance, to reply to a televised question/reply game as and when the questions are asked. Or again, an electronic device dissimulated in a fluffy toy allows the toy to react to a broadcast programme or a programme played back on a video cassette recorder. In fact, the interactivity is not real as the string of good replies or the reactions of the toy follows preestablished sequences, common to the memory of the interactive device and the broadcast or played back programme. As the audiovisual sequence was prerecorded in accordance with a selected code, its execution is predictable and therefore the only information to be transmitted to the interactive device is the start signal and the exact timing of the questions/replies or the various possible reactions in the case of a toy.

There is also a demand for the automatic identification of a sound sequence, accompanied by an image or not. For the broadcasters, this is used to check that a given programme is correctly broadcast on the frequency allocated to it; this can become fairly complex when a national programme is affected by regional or local disconnectings. This also allows the controlling bodies to count the broadcasting of works protected by copyrights or to check the conformity of the broadcasting of commercials. Finally, for sample survey or audience evaluation organisations, it is used to rapidly identify that which is actually listened to or seen by a listener or a viewer. Today, to assess a radio audience, the only solution available is to conduct a sample survey by interviewing the consumers.

All these applications are easy to incorporate when designing new radio or TV broadcasting systems, especially digital systems. However, existing systems and equipment populations do not in general easily lend themselves well to this development and experience proves that, from a sales engineering viewpoint, the compatibility and the relative cost of the processes and devices to be implemented are critical factors when introducing a new service.

For the transmission of data concerning a broadcast programme, two techniques are currently used.

The first technique consists in transmitting these data outside of the passband occupied by the signal of the transmitted programme (sound and possibly image). A solution exists, for instance, in sound broadcasting by multiplex frequency modulation, in using the upper part of the multiplex, between 54 and 76 kilohertz. Another example consists in using the lines available during frame retrace for TV broadcasting. These techniques have drawbacks. The saturation of the frequency resources available for broadcasting limits the number of users of these resources. Also, receivers adapted to the passbands used to transmit the emitted information are required.

Another technique consists in transmitting the data in the passband of the signal of the transmitted programme; this technique does not require the use of dedicated frequency bands. It is therefore not necessary to use transmitters and receivers with a frequency adapted to transmit these dedicated frequency bands. Typically, the original signal (corresponding to the programme to be transmitted) is filtered at origin to eliminate the frequency components in a given frequency band and the data is inserted in this band. The original signal is therefore deformed which may be unpleasant for a viewer or a listener not interested in the data. Therefore, the time dedicated to transmitting the information is limited by the broadcasters to the strict minimum which reduces the data flow rate accordingly. Thus, for interactive devices in the television field, the data is loaded globally, in one go, at the start of a given application. It is then impossible to adapt the data subsequent to a modification in the programme which must be run according to scheduled timing and without unexpected interruptions. Filtering means can of course be used at the receivers so as not to systematically pass on the sound or visual data received, this data then being transparent to the listener or the viewer. Nevertheless, we cannot ensure that the signal seen or heard by the viewer or listener will be the same as the original signal that he would have perceived before the insertion of the data.

OBJECTS AND SUMMARY OF THE INVENTION

In view of the above, the purpose of the invention is to propose a system to allow transmission of data in the passband of a signal including an audio-frequency component, without modifying, in relation to the original audio-frequency signal, the signal perceived by the listener. The invention proposes to insert these data in the so-called masked frequency bands of the original audio-frequency signal, if these bands exist, that is at a level lower than the instantaneous auditory threshold due to the auditory masking phenomena induced by the original audio-frequency signal itself. The data transmitted are then inaudible, do not alter the original audio-frequency signal from a subjective viewpoint and do not require the use of frequency components located outside of the spectral band occupied by the original signal. The invention therefore proposes data transmission adapted to the use of existing receivers and transmitters and subjectively not disturbing for the listener.

The invention thus concerns a data broadcasting system, this information being transmitted in the passband of a broadcast audio-frequency signal characterised in that it includes means for determining in at least one frequency band the amplitude of the audio-frequency signal and for comparing this amplitude with an auditory masking level associated with this frequency band, means for eliminating the frequency components from the audio-frequency signal in the said frequency band if the amplitude of the signal is lower than the auditory masking level of the said band, and means for inserting the said information into this frequency band at a level lower than or equal to the auditory masking level of the said frequency band.

BRIEF DESCRIPTION OF THE DRAWINGS

Other features and advantages will appear in reading the description which follows, and which is to be read in conjunction with the appended drawings on which:

FIGS. 1 and 2 represent diagrams showing the auditory masking phenomenon,

FIG. 3 represents a data extraction device,

FIG. 4 represents a data insertion device,

DESCRIPTION OF THE PREFERRED EMBODIMENTS

FIGS. 1 and 2 are amplitude versus frequency diagrams illustrating the auditory masking phenomenon which is a phenomenon of a physiological origin.

If we consider the hearing by a human being of an audio-frequency signal with a given frequency and amplitude, the auditory masking phenomenon is reflected by the non-perception, by this same human being, of audio-frequency signals transmitted simultaneously and with amplitudes lower than the given threshold levels.

Thus, in reference to FIG. 1, if we consider a single-frequency signal at frequency $f_0$, located in the audio-frequency spectrum (typically between 20 and 15,500 Hertz) and with an amplitude $A_0$, we can define an amplitude and frequency range $M(f_0, A_0)$ such that any single-frequency signal emitted simultaneously of frequency fs in a limited frequency range [f0m, f0M] where $f_{0m} < f_0$ and $f_{0M} > f_0$ and amplitude $A < A(f_s, f_0, A_0) < A_0$ is inaudible.

The values $f_{0m}$, $f_{0M}$ are variable for a given frequency $f_0$. In practice, the higher the amplitude $A_0$ the wider the range $[f_{0m}, f_{0M}]$. It can also be noted that the range is not symmetrically in relation to $f_0$ and extends more widely in the range of frequencies greater than $f_0$.

The amplitude value $A(f_s, f_0, A_0)$ varies with fs, $f_0$, and $A_0$. In practice, the nearer $f_s$ is to $f_0$, the higher the inaudibility threshold $A(f_s, f_0, A_0)$.

The auditory masking phenomenon has been known for several years. For further details, refer to the work entitled "Psychoacoustique" by E. Zwicker and R. Feldtkeller, Ed. Masson, 1981. The experimental results described in this work gave rise to a standardization (standard ISO/IEC 11172-3).

A masking level curve M(S) can be defined (shown by the dotted line on FIG. 2) for any signal S covering the audio-frequency spectrum $[f_m, f_M]$, where $f_m = 20$ Hertz and $f_M = 15,500$ Hertz. In the example shown on FIG. 2, two ranges $[f_{1m}, f_{1M}]$ and $[f_{2m}, f_{2M}]$ can be seen where the masking level curve M(S) has an amplitude higher than that of signal S. In concrete terms, this means that the spectral components in these ranges are inaudible for the human being. Consequently, the subjective auditory rendition of a signal S' identical to signal S outside of these ranges, and without frequency components in these ranges, will be identical to the rendition of signal S shown on FIG. 2.

The modelling of the auditory masking phenomena has given rise to the dividing of the audio-frequency spectrum into twenty four separate ranges, called critical bands, such that the combination of the twenty four critical bands covers the frequency range between 20 Hertz and 15,500 kiloHertz. Each critical band $B_i$ (i integer index from 1 to 24) is defined by its central frequency fc and its width.

The table below gives, for each critical band, the value of the central frequency and its width.

| Critical band | Central frequency fc (Hz) | Bandwidth (Hz) |
|---|---|---|
| B1 | 60 | 80 |
| B2 | 150 | 100 |
| B3 | 250 | 100 |
| B4 | 350 | 100 |
| B5 | 455 | 110 |
| B6 | 570 | 120 |
| B7 | 700 | 140 |
| B8 | 845 | 150 |
| B9 | 1000 | 160 |
| B10 | 1175 | 190 |
| B11 | 1375 | 210 |
| B12 | 1600 | 240 |
| B13 | 1860 | 280 |
| B14 | 2160 | 320 |
| B15 | 2510 | 380 |
| B16 | 2925 | 450 |
| B17 | 3425 | 550 |
| B18 | 4050 | 700 |
| B19 | 4850 | 900 |
| B20 | 5850 | 1100 |
| B21 | 7050 | 1300 |
| B22 | 8600 | 1800 |
| B23 | 10750 | 2500 |
| B24 | 13750 | 3500 |

We can see that the critical bands have variable widths, the narrowest being the first critical band $B_1$, which covers the lowest frequencies, and the widest being the twenty fourth critical band $B_{24}$ which covers the highest frequencies.

For each critical band, standard ISO/IEC 11172-3 defines a critical band masking level Nm(i). This is an approximation of the level of the curve of the masking level over the complete critical band (the real level of the masking level curve for a given signal can vary in a given critical band). The masking level Nm(i) is defined according to the masking levels of the eight lower critical bands (Nm(i−8) to Nm(i−1)) if they exist, and the three upper bands (Nm(i+1) to Nm(i+3)), if they exist.

We have Nm(i)=Σ Nm(j), where j positive integer index such that j ∈ [i−8, . . . , i−1, i+1, . . . , i+3], $Nm(j) = 10^{[Xnm(j) - Av(j) - Vf(j)]/20}$, $Xnm(j) = 20 \log_{10}(Av(j)) + 5.69$ dB (sound pressure), $Av(j) = 6.025 + 0.275 * z(j)$ for the tonal lines, $Av(j) = 2.025 + 0.175 * z(j)$ for the non-tonal lines, where Av(j) is the masking index of $j^{th}$ critical band and j and z(j) the ratio of the $j^{th}$ critical band, $Vf(j) = (i-j-1) * (17 - 0.15 * Xnm(j)) + 17$, of j from i−8 to i−1, and $Vf(i+1) = 0.4 * Xnm(i+18) + 6$, $Vf(i+2) = 17 * Xnm(i+2) + 6$, $Vf(i+3) = 34 * Xnm(i+3) + 6$.

z(j) is a constant defined for each critical band and z(1)=0.62 dB, z(2)=1.8 dB, $_z$(3)=2.4 dB, z(4)=3.6 dB, z(5)=

4.7 dB, z(6)=5.8 dB, z(7)=6.7 dB, z(8)=7.7 dB, z(9)=8.9 dB, z(10)=10.0 dB, z(11)=10.9 dB, z(12)=12.0 dB, z(13)=13.1 dB, z(14)=14.0 dB, z(15)=14.9 dB, z(16)=15.8 dB, z(17)=16.7 dB, z(18)=17.7 dB, z(19)=18.8 dB, z(20)=19.8 dB, z(21)=20.9 dB, z(22)=22.2 dB, z(23)=23.2 dB and z(24)=23.9 dB.

In general, the most masked critical bands are the high frequency bands of the audio-frequency spectrum which are masked by the low frequency bands, statistically more powerful.

After this brief look at the auditory masking phenomenon and its modelling, an example of the implementation of the invention will now be described consisting of transmitting the data in the passband of a broadcast audio-frequency signal.

The data can be either analog (musical patterns for example) or digital (that is binary data). The data may concern broadcast audio-frequency signals (for example the name of a radio station or the references of musical works transmitted by this station) and its purpose is to be perceived by the auditor, for example via a liquid crystal display. This data could also be service data for the signal broadcaster or the controlling authorities and be imperceptible to the listener.

In the remainder of the description given as an example, it will be assumed that the data are binary data. These data will be relevant, for example, to the programmes broadcast by a radio station.

A radio station generally transmits, in the direction of these listeners, audio-frequency signals modulated by conventional amplitude or frequency modulation techniques. These audio-frequency signals could be a song, a signature tune, the voice of a host, etc.

The invention proposes to calculate, from the audio-frequency signal to be transmitted, for one or more critical bands Bi of the audio-frequency spectrum, the masking level or levels of this or these critical bands. If, for a critical band, the masking level is higher than the level of the audio-frequency signal, the corresponding part of the audio-frequency signal can be eliminated without a difference perceptible to the listener. The invention proposes to insert data (we shall speak of data audio-frequency signals) in a way inaudible to the listener into this critical band or a part of this critical band to replace the original audio-frequency signal (provided that, of course, the level of the audio-frequency signal of the data is lower than the critical band masking level). For the reception of the transmitted signal, it is sufficient to filter the signal received as a function of the critical bands to separate the data audio-frequency signal and process the transmitted data.

We can see that the flow rate of the transmitted information cannot in practice be fixed, the original signal (and therefore the corresponding critical band masking levels Nm(i)) being a priori variable over time both in frequency and in amplitude.

A data transmission system according to the invention will mainly include a data insertion device (an example of which is shown on FIG. 4) and the data reception device (an example of which is shown on FIG. 3). Typically, the data insertion device could be used either at the sound or visual broadcasting final control room stage or at the audio-frequency signal production stage. The data reception device will include for example a received data display device (if the data are intended for the listener) and/or a storage device (if the data are dedicated for example to a deferred audiometry control). The reception device could also include a device for retransmitting information, for example to a game remote for interactive television programmes. The data audio-frequency signal could be collected, at the reception device, either acoustically by a simple microphone (placed beside the loudspeaker of the radio receiver), or electrically using an appropriate connector (such as an audio recording output).

In reference to FIG. 4, we will describe, as an example, a data insertion device 1, the information being in this case binary data.

To transmit the data in the audio-frequency signal of a radio or TV programme, we replace, in certain frequency bands of this signal, the signal by a digital modulation. This transmission is preferably made at a level lower than the masking levels of these frequency bands in order to ensure the inaudible character of the transmitted information. Also, this transmission is preferably made when these masking levels are sufficiently high to ensure a satisfactory signal-to-noise ratio in relation to the broadcasting channel.

In an example, the data to be transmitted could be organised into frames consisting of a start word and a defined number of data words. Also, a frame could be chosen including a start word, a variable number of data words, and an end word.

The data insertion device 1 shown on FIG. 4 includes an input 2 to receive the original audio-frequency signal S to be transmitted (song, voice of a host, etc.), an input 3 to receive the data D to be transmitted, and an output 4 to deliver an audio-frequency output signal S' produced from the original audio-frequency signal S and the data D.

The audio-frequency signal S is filtered by a bench of twelve bandpass filters FPB' 13 to FPB' 24, preferably complex, receiving at input the audio-frequency signal S. The analytical processing of the signal S facilitates the calculation of the amplitudes. Each complex filter produces at output the real part ($R'_{13}$ to $R'_{24}$) and the imaginary part ($I'_{13}$ to $I'_{24}$) of the audio-frequency signal S in the frequency band (called $F'_{13}$ to $F'_{24}$) that it lets through. As will be seen, the bank of complex bandpass filters $FPB'_{13}$ to $FPB'_{24}$ enables the components of the audio-frequency signal S in the frequency bands $F'_{13}$ to $F'_{24}$ to be eliminated to insert the data. These frequency bands ($F'_{13}$ to $F'_{24}$) are bands included in the critical bands $B_{13}$ to $B_{24}$. An amplitude calculation element OAC1 calculates the amplitudes $A'_j$ (j integer index from 13 to 24) from signals $R'_j$ and $I'_j$ delivered by the filters $FPB'_{13}$ to $FPB'_{24}$.

The audio-frequency signal S is also filtered by a bank of twenty bandpass filters $FPB_5$ to $FPB_{24}$, preferably complex, receiving at input the audio-frequency signal S. Each complex filter produces at output the real part ($R_5$ to $R_{24}$) and the imaginary part ($I_{13}$ to $I_{24}$) of the audio-frequency signal S in the frequency band that it lets through. The bank of complex bandpass filters $FPB_5$ to $FPB_{24}$ enables the masking levels of the critical bands $B_{13}$ to $B_{24}$ to be calculated. This calculation is done from an amplitude calculation element OAC2 calculating the amplitudes $A_i$ (i integer index from 5 to 24) from signals $R_i$ and $I_i$ delivered by filters $FPB_5$ to $FPB_{24}$. These amplitudes are delivered to a calculating processor ON calculating the masking levels Nm(13) to Nm(24).

The amplitudes $A'_{13}$ to $A'_{24}$ and the masking levels Nm(13) to Nm(24) are delivered to a control element OC which will compare them two at a time to determine if two amplitudes $A'_{j1}$ and $A'_{j2}$ exist lower than the corresponding masking levels Nm(j1) and Nm(j2) (j1 and j2 being two different integer indexes between 13 and 24). If this is the case, there is at least two frequency bands $F'_{j1}$ and $F'_{j2}$ in the audio-frequency spectrum for which signal S is inaudible.

Signal S can then be filtered to eliminate these spectral components in these two frequency bands $F'_{j1}$ and $F'_{j2}$.

To do this, the real components, called $R'_1$ and $R'_2$, are subtracted from the signal S in these two frequency bands $F'_{j1}$ and $F'_{j2}$ of the original signal S. These two components $R'_1$ and $R'_2$ are delivered via a multiplexing device MUXP receiving the components $R'_{13}$ to $R'_{24}$, each of these components being weighted so that all but two of them ($R'_{j1}$ and $R'_{j2}$) are cancelled. This MUXP device is controlled by the control element OC. These components (for example we have $R'_1=R'_{j1}$ and $R'_2=R'_{j2}$) are then subtracted from the signal S (this signal having been delayed to take into account the time required to pass through the filters and the multiplexing device) in two adders SM1 and SM2 so that an audio-frequency signal $S'M=S-R'_1-R'_2$ is produced. This audio-frequency signal S'M is subjectively identical, for the listener perceiving it, to signal S.

The assembly formed of the bandpass filters F'13 to F'24, the multiplexing device MUXP and the adders SM1 and SM2 acts as an adaptive band-stop filter vis-à-vis signal S.

The frequency bands $F'_{j1}$ and $F'_{j2}$ being freed to allow insertion of data D, we will now look at this insertion.

Conventionally, the binary data D will first of all be conditioned. Note that this conditioning operation is in any event independent of the freeing of the frequency bands $F'_j$ in the audio-frequency signal S. The data D to be transmitted are conditioned in a device MFB so as to be transmitted in required frame form (that is by inserting start and possibly end words, redundant codes, etc.). Then, two data audio-frequency signals $S_1$ and $S_2$ will be produced by means of a modulator MOD. The digital modulation used will be for example a QPSK (Quadrature Phase Shift Keying) modulation, the conditioned data, NRZ (Non Return to Zero) coded, modulating the phase of two frequency carriers included in bands $F'_{j1}$ and $F'_{j2}$, preferably corresponding to the centre frequencies of the used bands $F'_{j1}$ and $F'_{j2}$ (which allows the complete width of these bands to be used to transmit the data audio-frequency signals $S_1$ and $S_2$). This modulation step requires of course knowledge, via the control element OC, of the frequency bands freed in the spectrum of signal S.

In parallel with the freeing of the bands $F'_{j1}$ and $F'_{j2}$, the masking levels Nm(13) and Nm(24) are delivered by the element ON to a multiplexing device MUXN which will produce two levels N'm=Nm(j1) and N"m=Nm(j2) at output. In order to take the modulation chosen to produce signals $S_1$ and $S_2$ into account, two coefficients N' and N" will be produced from coefficients N'm and N"m using an automatic gain control device CAG. By means of two multiplexers M1 and M2, two data audio-frequency signals $S'_1=N'*S_1$ and $S'_2=N"*S_2$ will then be produced. By summing signals $S'_1$, $S'_2$ and $S'_M$ in to adders SM3 and SM4, a signal $S'=S-(R'_1+R'_2)+(S'_1+S'_2)$ is produced. The signal S' produced includes both the audible audio-frequency components of the original audio-frequency signal S and the data D (represented by $S'_1$ and $S'_2$) which are inaudible.

Once signal S' has been produced, it will conventionally be modulated according to known techniques before being transmitted to the listeners' receivers.

Note that as the gain applied to signals $S_1$ and $S_2$ is only proportional to the masking levels of the $j_{1-th}$ and $j_{2-th}$ bands $F'_{j1}$ and $F'_{j2}$, the amplitude level of signals $S'_1$ and $S'_2$ could be greater than the amplitude levels of the components of signal S which were removed.

Preferably, bands $F'_{13}$ to $F'_{24}$ have same width to ensure a fixed transmitted data flow rate irrespective of the bands $F'_{13}$ to $F'_{24}$ used to transmit them. A same type of modulation can thus be used irrespective of the bands freed in signal S. In the example shown, the possibility of transmitting the data in the last twelve critical bands, from critical band $B_{13}$ (fc=1860 Hz) to critical band $B_{24}$ (fc=13750 Hz) is provided for. As has been seen, this information is transmitted in two bands each located in one of the twelve critical bands. Of course, the higher the number of bands $F'_j$ used simultaneously, the higher the transmitted data flow rate. A data insertion device using all freeable bands $F'_j$ can therefore be made. Nevertheless, it can be seen that simultaneous use of a reduced number of bands $F'_j$ enables the distortion probability of the original audio-frequency signal to be reduced if this signal varies to a high extent from one moment to another (although this probability is low on account of the temporal masking of the human ear).

Whatever the critical band or bands in which the data are inserted, it is easy to understand that the band or bands $F'_j$ used within these critical bands have a width lower than or equal to the width of the corresponding critical bands.

In the example shown, the first bench of bandpass filters consists preferably of bandpass filters $F'_{13}$ to $F'_{24}$ with bandwidths equal to 280 Hz at −3 decibels. This width corresponds to the width of the critical band usable to insert the data which has the lowest width, that is the width of the thirteenth critical band (of course, it is supposed here that the carrier frequencies used to produce the data audio-frequency signals are equal to the central frequencies of the critical bands). There is therefore little reason to use data transmission in the lower critical bands as their widths are lower and this would limit the maximum permissible flow rate.

The bank of filters $F'_{13}$ to $F'_{24}$ is preferably achieved by multi-rate filtering thus giving a constant propagation time and a limited number of operations.

The second bank of filters $F_5$ to $F_{24}$ is preferably obtained from reconstructible bandpass filters (that is filters such that the sum of the filtered output signals is the same as the input signal before filtering) the envelopes of which correspond to the critical bands. In other words, it is interesting to calculate as finely as possible the critical band masking levels to avoid producing data audio-frequency signals which could be audible.

The binary information is for example grouped into words of thirty-two bits. A transmitted frame will include for example a start word, coded over thirty-two bits and a data word of thirty-two bits. The start word consists for example of the first nine bits comprising a lock-on ramp used in the reception device, the next twenty-three bits forming the synchronisation word. The data word consists for example of three bytes representing the data and a last redundancy byte for an error correction code if such a code is used. This organisation of the information frames corresponds to a transmission of information on the time frames of the audio-frequency signal lasting 256 milliseconds, which corresponds to the time required to transmit the sixty-four bits, that is two data frames. This enables a maximum binary flow rate of 500 bits per second to be attained.

Preferably, the data frames are transmitted provided that the masking levels of the critical bands used to insert the data are greater than the minimum energy level providing resistance to the disturbances induced by the channel.

Although not specified, it is of course preferable not to free frequency bands in the original audio-frequency signal when there is no data to be transmitted. For this, it is sufficient to cancel the signals produced at the output of the multiplexing device MUXP. Thus, even if the masking level of the original signal varies rapidly and extensively, there is no risk of disturbing the original signal by suppressing audible frequencies. Once the data transmission has been made, progressive cancellation of the output signals of the multiplexing device MUXP will preferably be carried out to reduce the probability to make the "filling in" audible.

If the masking level of the original audio-frequency signal drops and the start word has been transmitted, transmission will be preferably continued to facilitate data processing at the level of the reception device. If the data are coded over thirty-two bits, this is not very troublesome on account of the temporal auditory masking.

The data extraction device 5 shown on FIG. 3 includes an input 6 to receive the audio-frequency signal S'.

The audio-frequency S' is filtered by a bank of twelve bandpass filters $FPB''_{13}$ to $FPB''_{24}$ with envelopes identical to the twelve filters $FPB''_{13}$ to $FPB''_{24}$. Twelve audio-frequency signals $S'_{13}$ to $S'_{24}$ are thus produced corresponding to the spectral components of signal S in bands $F'_{13}$ to $F'_{24}$ where it is likely that we shall find the data inserted by a device similar to the one described as reference on FIG. 4.

Device 5 includes a bank of twelve demodulators $DEMOD_{13}$ to $DEMOD_{24}$, each demodulator being associated with one of the bandpass filters. Once the signals have been demodulated, they are sampled in samplers $EC_{13}$ to $EC_{24}$ associated with the clock recovery devices $RC_{13}$ to $RC_{24}$ to produce the binary data.

Once the audio-frequency signals have been sampled, the binary data produced are processed in the recognition elements $RTB_{13}$ to $RTB_{24}$ to determine if these data are representative of the transmitted data (in which case the synchronisation bits of the start word will be present) or if these data correspond to nothing (the probability being fairly low that bits corresponding to the synchronisation bits of a start word can be produced by sampling from any audio-frequency signal).

Of course, if the data transmitted are not digital data but analog data, such as a musical pattern for example, the data insertion and extraction devices will be adapted to suit. In particular, it will not be necessary to use the modulation, demodulation and sampling devices. These will be replaced by means for converting the data to be inserted into frequencies to adapt the frequencies of the data to the frequencies freed in the insertion device.

What is claimed is:

1. System for broadcasting data (D), that transmits information in a frequency band of a broadcast audio-frequency signal (S), charterised in that it includes:

means for determining in at least one frequency band the amplitude of the audio-frequency signal (S) and for comparing this amplitude with an auditory masking level associated with his frequency band, means for eliminating the frequency components of the audio-frequency signal in the said frequency band if the amplitude of the signal is lower than the auditory masking level of the said band, and means for inserting the said data into this frequency band at a level lower than or equal to the auditory masking level of the said frequency band.

2. System in accordance with claim 1, characterised in that the frequency band is within a critical frequency band.

3. System in accordance with claim 2, characterised in that the frequency band has a central frequency same as the central frequency of the critical frequency band.

4. System in accordance with claim 1, characterised in that it includes means for inserting the data in at least two separate frequency bands ($F'_{j1}$, $F'_{j2}$).

5. System in accordance with claim 4, characterised in that the separate frequency bands ($F'_{j1}$, $F'_{j2}$) are included within critical bands ($B_{j1}$, $B_{j2}$), the critical bands ($B_{j1}$, $B_{j2}$) being of separate widths.

6. System in accordance with claim 5, characterised in that the separate frequency bands ($F'_{j1}$, $F'_{j2}$) have a central frequency same as the central frequency of the critical band ($B_{j1}$, $B_{j2}$) in which they are included.

7. System in accordance with one of the claims 5 and 6, characterised in that the separate frequency bands ($F'_{j1}$, $F'_{j2}$) have the same width.

8. System in accordance with claim 7, characterised in that the width of the separate frequency bands ($F'_{j1}$, $F'_{j2}$) is equal to the width of the critical band ($B_{j1}$, $B_{j2}$) in which they are included having the lowest width.

* * * * *